United States Patent [19]

Henrot

[11] Patent Number: 5,524,063
[45] Date of Patent: Jun. 4, 1996

[54] CHARACTER READING APPARATUS

[75] Inventor: Denis Henrot, Louisville, Colo.

[73] Assignee: Soricon, Inc., Boulder, Colo.

[21] Appl. No.: 201,761

[22] Filed: Feb. 25, 1994

[51] Int. Cl.⁶ .............................. G06K 9/00; G06K 9/46; G06K 9/20

[52] U.S. Cl. .......................... 382/139; 382/140; 382/207; 382/320

[58] Field of Search .................................... 382/7, 64, 29, 382/137, 138, 139, 140, 207, 320

[56] References Cited

U.S. PATENT DOCUMENTS

| | | | |
|---|---|---|---|
| 3,391,387 | 7/1968 | Flores | 340/146.3 |
| 3,558,860 | 1/1971 | Bauldreay et al. | 235/61.11 |
| 3,571,793 | 3/1971 | Britt | 340/146.3 |
| 3,627,990 | 12/1971 | Sallach | 235/458 |
| 3,629,829 | 12/1971 | Ordower | 382/7 |
| 3,796,861 | 3/1974 | Hirata et al. | 235/61.11 |
| 3,818,446 | 6/1974 | Benson | 340/146.3 |
| 3,831,009 | 8/1974 | McMillin | 235/61.11 |
| 4,143,355 | 6/1979 | MacIntyre | 340/146.3 |
| 4,797,938 | 1/1989 | Will | 382/7 |
| 4,984,281 | 1/1991 | Matsuhashi et al. | 382/139 |
| 5,054,092 | 10/1991 | LaCaze | 382/11 |
| 5,134,663 | 7/1992 | Kozlowski | 264/22 |
| 5,257,319 | 10/1993 | Canu et al. | 382/7 |
| 5,347,593 | 9/1994 | Klinefelter | 382/7 |

Primary Examiner—Leo H. Boudreau
Assistant Examiner—Matthew C. Bella
Attorney, Agent, or Firm—Stephen C. Shear

[57] ABSTRACT

An apparatus for reading a series of magnetic characters on a bank check is herein disclosed. The characters are pre-printed in a certain way within a predetermined area of the check. Also, the characters within the series of characters may be any character from a predetermined group of characters. The apparatus includes a housing which defines a specific path through which the check, oriented in a predetermined way, is intended to pass. The housing supports a magnetic read head for sensing the magnetic characters on the check as it passes through the apparatus and for producing an electrical signal unique to each character. The housing also supports automatically moving the check through the path defined by the housing at a speed which is intended to be constant but which may vary randomly within a certain tolerance. This moving of the check through the apparatus produces the electrical signals as the characters move past the read head. A character recognition is electrically connected with the read head and is responsive to the electrical signals for identifying the characters without monitoring the speed of the check as it moves through the apparatus even when the check moves through the path at a random varying speed so long as the variation in speed stays within a certain tolerance, for example ±10%.

18 Claims, 16 Drawing Sheets

| | Idealized Wave Form | | | Measured Wave Form | | | | |
|---|---|---|---|---|---|---|---|---|
| | Peak Amplitude | Peak Weight | Peak Location | Peak Amplitude | Peak Weight | Peak Location | Normalized Peak Location | Score |
| Leading Positive Peak | 130 | 29% | 0 | 51 | 29% | 0 | 0.00 | 29 |
| Second Positive Peak | 103 | 23% | 10 | 30 | 17% | 63 | 6.12 | 14.9 |
| Second Negative Peak | -90 | 20% | 60 | -43 | 25% | 10 | 0.97 | 19.4 |
| Trailing Negative Peak | -126 | 28% | 70 | -50 | 29% | 72 | 7.00 | 28 |
| | | | | | | | Total | 91 |
| | | | | | | | Score | 9 |

CHARACTER READING APPARATUS

BACKGROUND OF THE INVENTION

The present invention relates generally to a character reading apparatus and more specifically to an apparatus for reading a series of preprinted magnetic characters on a bank check while the check is being automatically moved through the apparatus.

To improve the efficiency of check processing, bank checks have been standardized to include a set of magnetic characters preprinted in a certain way in predetermined areas on the checks. These magnetic characters include bank numbers, account numbers, and other specific alphanumeric and symbolic information. FIG. 1 illustrates a standard bank check .generally designated by reference numeral 10. Check 10 includes a specific area which is made up of a certain number of cells 12, each of which is a standard size. The United States banking system has developed what is referred to as the E13B standard which defines a standardized set of magnetic characters preprinted in specific locations within the, se cells. FIG. 2 illustrates two of the characters within this set of characters, the zero and the one, and shows their proper location within their cells.

Referring to FIG. 2, each cell 12 is divided into ten equal width zones 14. Each of the characters making up the standard character set is specifically defined by positioning magnetic printing within certain portions of certain zones 14 of a given cell 12.

The above described character set was developed to allow automated reading of the characters using a magnetic read head. FIGS. 3A–N are graphs illustrating the expected analog electrical signal waveform generated by each of the magnetic characters making up the standard character set when the characters are moved past a magnetic read head in a specific way, that is, at a specific orientation with respect to the read head and at a specific constant speed. For purposes of convenience, the various waveforms are designated by the reference numerals 15A–N.

In order to accurately identify a character, you must first accurately generate its unique waveform. This requires not only moving the characters past a read head to generate a waveform but also requires determining which specific portions of the resulting waveform correspond to each portion of each character. Two prior art general approaches have been used to provide a device which is intended to read the above described standard magnetic character sets.

The first approach attempts to hold the velocity of the check constant as the check moves past the read head and synchronizes its recognition circuitry with the known velocity. As the waveform is generated the known velocity is used to divide the waveform into sections which correspond to each character. These character waveforms characteristics am then compared with stored, expected waveform characteristics to identify each character. If for some reason the velocity has varied, the waveforms characteristics may not match any of the expected waveforms characteristics and a particular character may not be recognized, or may be recognized incorrectly, which is even worse than not recognizing it at all. To minimize this problem, typically a flywheel or other high inertial system is used to obtain constant velocity, While this may be satisfactory for some applications, it requires larger more expensive drive motors, gears, or other components which increase the costs. Also the electrical requirements are typically larger and the device requires a more expensive regulated power supply.

In the second approach, the displacement of the check relative to time is monitored as the check moves past the read head. Therefore this approach is not concerned with variations in the speed of the check, at least to a limited extent. The information provided by monitoring the movement of the check is used to adjust the information provided by the electrical signal waveform from the read head. This combination of information is then used to match the expected signal that would be generated if the speed had been a specific constant speed. A character recognition device of this type must include an arrangement for measuring the displacement of the check and an arrangement for storing and using this information to modify the information provided by the read head. These additional components which make up the above described arrangements again add to the expense of the device. Also, the additional requirement: of modifying the information from the read head requires a more powerful processing device adding still more to the costs and increasing the required processing time.

Both of the above described approaches to providing a character recognition device require some method of storing and processing the information defining the expected waveform for each of the characters in the character set. Typically this is done by storing a complete analog or digital representation of the expected analog waveform. This approach requires a relatively large amount of memory space and a more powerful processor to handle this volume of information, again adding to the expense of the device.

SUMMARY OF THE INVENTION

As will be seen hereinafter, the present invention allows for a device which can read magnetic check characters without requiting a constant velocity of the check through the device and without having to monitor the displacement of the check through the device. As a result, the present invention does not require more expensive drive motors, flywheels, or regulated power supplies in order to maintain a constant velocity. Also, the present invention does not require any arrangement for monitoring the displacement of the check, again avoiding the expense involved in providing such an arrangement.

The present invention also has an added advantage over the prior art in that it compresses the electrical signal waveform generated by its read head into a digitized vectorization of that waveform which significantly reduces memory storage requirements and processing requirements. The expected waveforms for each of the possible characters are also stored in the form of digitized vectorizations. These reduced storage and processing requirements allow for a faster processing time while using simpler, less expensive memory and processing devices.

As will be described in more detail hereinafter, the advantages of the present invention related immediately above are incorporated into an apparatus disclosed herein. The apparatus is provided for reading a series of magnetic characters on a bank check. The characters are preprinted in a certain way within a predetermined area of the check. Also, the characters within the series of characters may be any character from a predetermined group of characters. This apparatus includes a housing which defines a specific path through which the check oriented in a predetermined way, is intended to pass. The housing supports means including a magnetic read head for sensing the magnetic characters on the check as it passes through the apparatus and for producing an electrical signal unique to each character. The housing also supports means for automatically moving the check through the path defined by the housing at a speed which is intended to be constant but which may vary randomly within a certain tolerance. This moving of the check through the apparatus produces the electrical signals as the characters move past the read head. Character recognition means are electrically connected with the read head and are responsive to the electrical signals for identifying the characters without monitoring the speed of the check as it moves through the apparatus, even when the check moves through the path at a random varying speed, so long as the variation in speed stays within a certain tolerance of nominal, for example ±10%.

In accordance with one particular feature of the present invention, the predetermined group of magnetic characters referred to above is divided into four subgroups. The character recognition means includes means for storing certain attributes respectively unique to the various characters making up the predetermined group of characters. The character recognition means also includes means for identifying each of the characters within the series by fast identifying the only two subgroups within which that character most likely resides. This eliminates from consideration the other two subgroups making up the overall character set. Thereafter, the character's unique electrical signal is compared to the stored attributes of the characters within the two identified subgroups thereby identifying the character.

In accordance with another particular feature of the present invention, the character recognition means includes means for converting the electrical signal unique to each character into a digitized vectorization of that unique signal. The character recognition means also includes means for storing certain attributes respectively unique to the various characters making up the predetermined group of characters in the form of digitized vectorizations known to be unique to each character.

BRIEF DESCRIPTION OF THE DRAWINGS

The features of the present invention may best be understood by reference to the following description of the presently preferred embodiments together with the accompanying drawings in which.

DETAILED DESCRIPTION OF THE PREFERRED EMBODIMENTS

Figure 1:
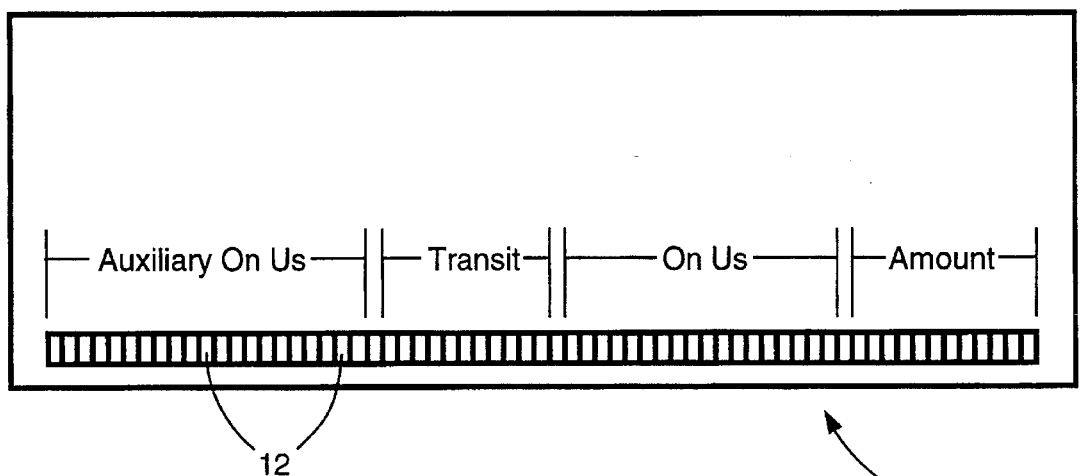
FIG. 1 is a schematic plan view of a bank check showing the E13 B standards for the positioning of the cells which make up the predetermined area of the check where magnetic characters are preprinted.
Figure 2:
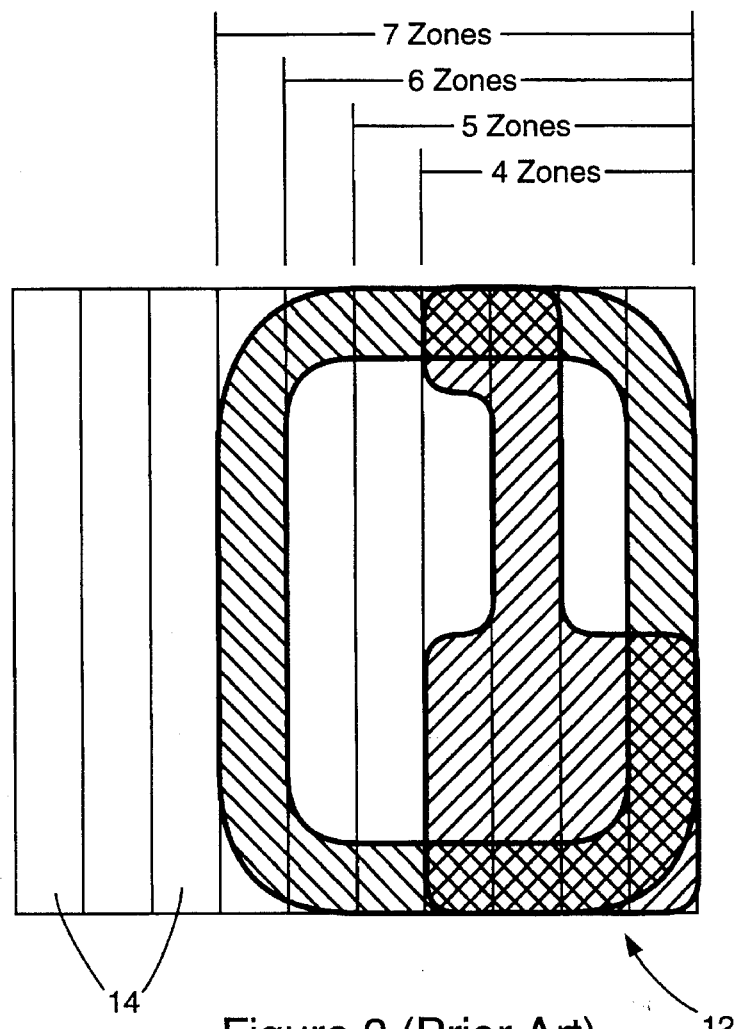
FIG. 2 is a schematic plan view of the zero and the one which are two of the characters which make up the E13B standard character set, these characters being shown in their proper position within a standard cell.

Inasmuch as FIGS. 1 through 3 were discussed previously, attention is directed to FIG. 4 which illustrates a check reading device which is generally designated by reference numeral 16, and which is designed in accordance with the present invention. Check reading device 16 includes a housing 18 which defines a specific path 20 through which check 10, oriented in a certain predetermined way, is intended to pass during normal operation of check reading device 16.

Figure 5:
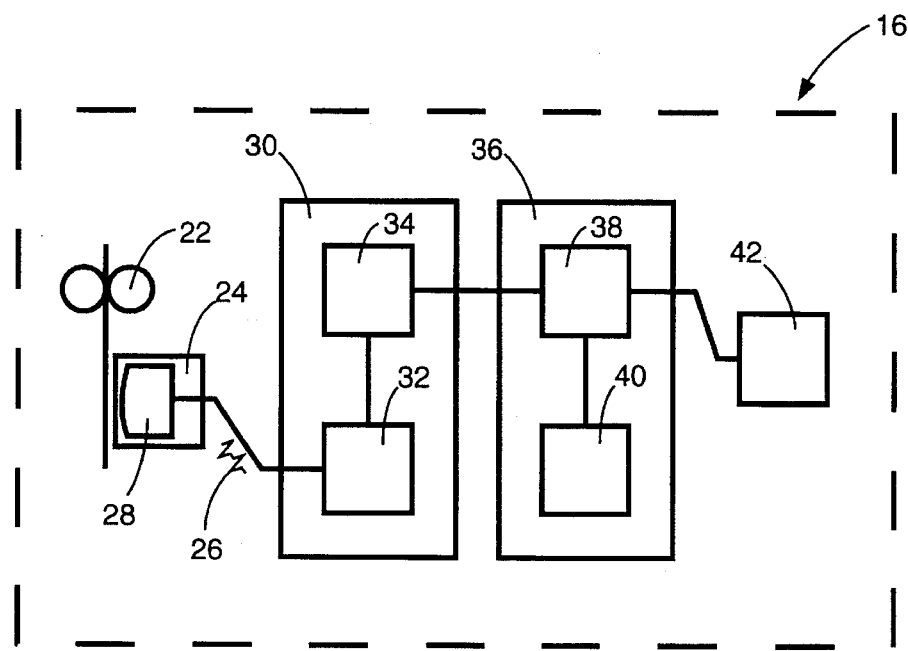
FIG. 5 is a schematic diagram illustrating the apparatus shown in FIG. 4.

Referring now to FIG. 5 overall device 16 is shown including housing 18 which supports a suitable and readily available arrangement 22 for automatically moving check 10 through path 20. Arrangement 22 causes check 10 to move at a randomly varying speed so long as the speed falls within a certain speed tolerance. In other words, arrangement 22 does not require more expensive drive motors, flywheels, or regulated power supplies which are required by some prior art character recognition devices to maintain a constant check velocity.. One example of character moving arrangement 22 is described in copending U.S. patent application Ser. No. 08/201,763 (attorney docket SOR1P002) entitled "Self Aligning, Low Power Character Reading apparatus" and filed cotemperaniously herewith, which application is incorporated herein by reference.

Still referring to FIG. 5, housing 18 also supports a suitable and readily available character sensing arrangement 24 for sensing the preprinted magnetic characters on check 10 and producing an analog electrical signal waveform 26 unique to each character. Character sensing arrangement 24 includes a magnetic transducer or read head 28 positioned adjacent to path 20 for producing an electrical signal waveform 26 as each of the characters moves past read head 28. The output of read head 28 is electrically connected to the input of a suitable and readily available processing circuit 30 which includes a signal amplifier 32 connected between the read head and an analog to digital (A/D) converter 34. Processing circuit 30 conditions signal 26 prior to signal 26 being acted upon by a character recognition circuit indicated at numeral 36.

Figure 3A:
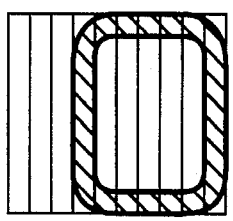
FIGS. 3A–N are graphs illustrating the expected analog electrical signal waveform generated by each of the magnetic characters which make up the E13B standard set of characters when the characters are moved past a magnetic read head in a predetermined way.
Figure 3A:
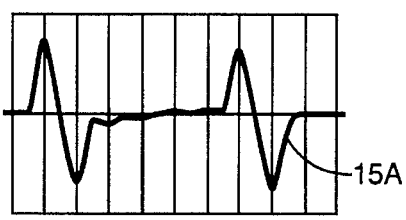
Figure 3B:
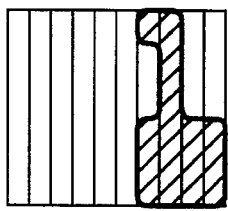
Figure 3B:
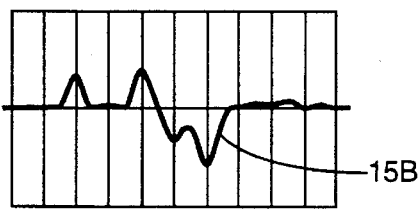
Figure 3C:
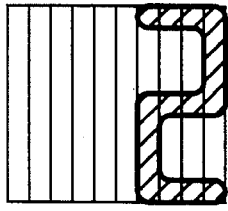
Figure 3C:
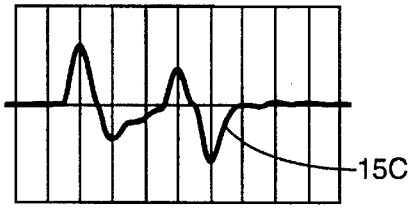
Figure 3D:
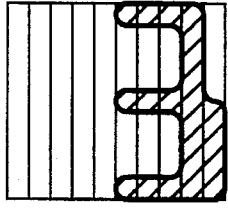
Figure 3D:
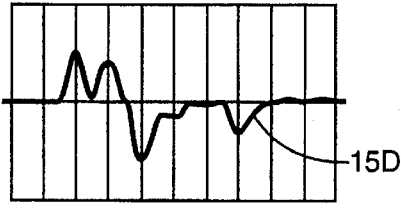
Figure 3E:
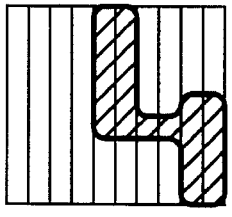
Figure 3E:
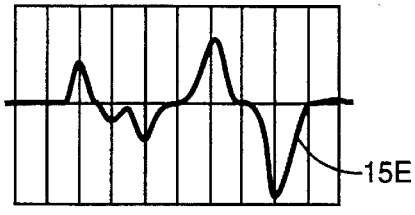
Figure 3F:
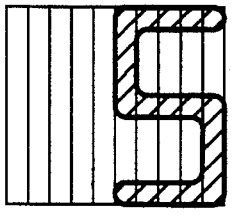
Figure 3F:
Figure 3G:
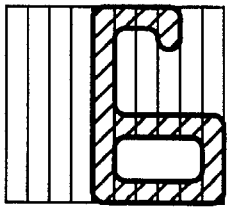
Figure 3G:
Figure 3H:
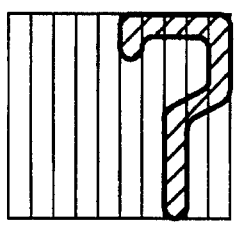
Figure 3H:
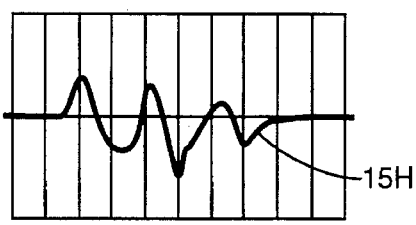
Figure 3I:
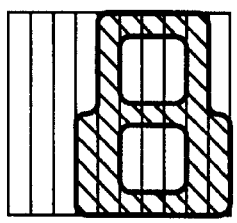
Figure 3I:
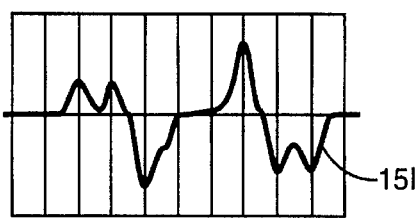
Figure 3J:
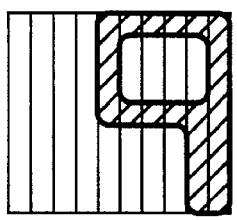
Figure 3J:
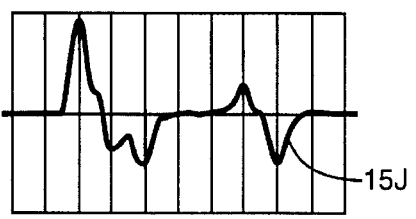
Figure 3K:
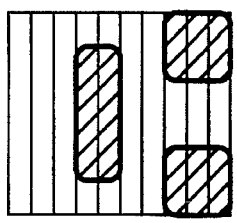
Figure 3K:
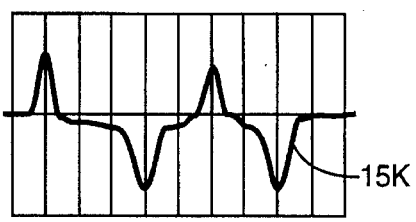
Figure 3L:
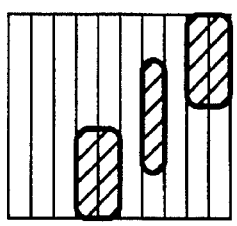
Figure 3L:
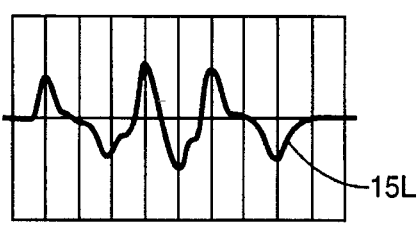
Figure 3M:
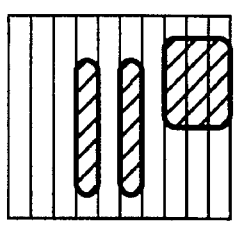
Figure 3M:
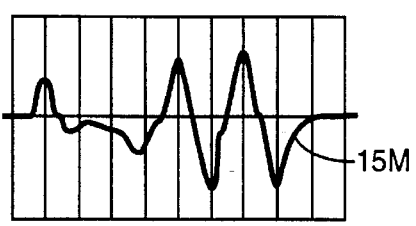
Figure 3N:
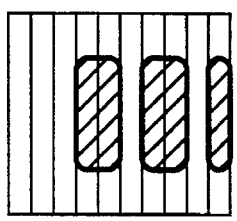
Figure 3N:
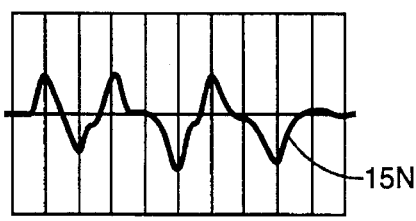
Figure 4:
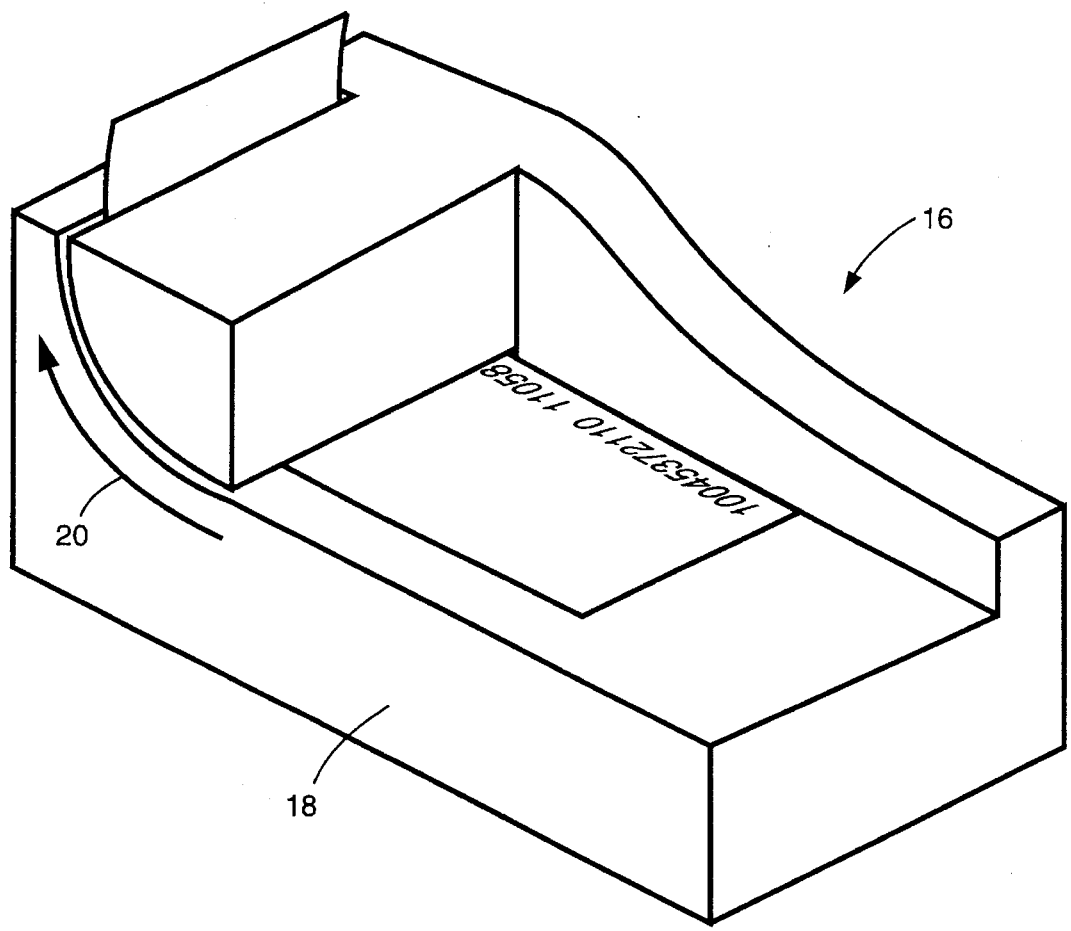
FIG. 4 is a diagrammatic perspective view of a check reading apparatus designed in accordance with the present invention and specifically showing the path through which a check is caused to move.

As shown in FIG. 5, character recognition circuit 36 includes a processor 38 along with a memory device 40 suitable for storing certain unique attributes of each of the characters of the group shown in FIGS. 3A–N. The function of circuit 36 is to receive each signal waveform 26, compare it to the unique stored attributes of the group of characters, and identify which one of the stored characters corresponds to signal 26, thereby identifying the characters printed on check 10. Circuit 36 also includes a suitable output arrangement 42 which allows the identified characters to be used by other devices, for example, a communication device which contacts an information center that verifies the validity of check 10.

As will be described in more detail hereinafter, one feature of character recognition circuit 36 is its ability to recognize each character on check 10 without requiring a constant check speed and without monitoring the speed and position of check 10. This is done by first dividing the group of possible characters into four such subgroups, each of which is characterized by the relative locations of its characters within their particular cells. With these subgroups in mind, each character is identified by first locating the beginning and the end of each character within and relative to its particular cell and based on this information identifying the only two subgroups within which that character most likely resides. This eliminates from consideration the other subgroups making up the set of all possible characters. Thereafter, the character's unique electrical signal waveform is compared to the stored attributes of those characters within the two identified subgroups only. This process of eliminating two subgroups significantly reduces the number of possible stored characters that must be compared to the character's unique signal which therefore significantly reduces the processing complexity and time required to identify each character. This allows a simpler, less expensive processor to be used. It also reduces the possibility of substitution errors by limiting the field of stored characters to be considered.

Referring back to the E13B character set illustrated in FIG. 2, the method by which this group of characters is subdivided into four subgroups will now be described. The preferred embodiment of the present invention utilizes the fact that the fourteen characters which make up this character set may be subdivided into these four subgroups. Each of the subgroups is made up of characters which are printed in the same right most zones of their respective cell (as viewed in FIG. 2) and are completely defined within the same specific number of zones within their respective cells. The first subgroup includes the numbers 1 and 2 which occupy the four zones at the right side of their cell as specified by the E13B standards. The second subgroup includes the numbers 3, 5, and 7 which occupy the five right most zones of their cell. The third subgroup includes numbers 4, 6, and 9 which occupy the six right most zones. And the fourth subgroup includes the numbers 0 and 8 along with four special characters referred to as TRANSIT, ON-US, AMOUNT, and a DASH which occupy the seven right most zones of their respective cells.

Now referring to FIGS. 3A–N, the way in which character recognition circuit 36 locates each character within its cell, that is, the way in which it locates the beginning and the end of each character will be described. The present invention utilizes the fact that when moving from right to left as viewed in FIGS. 3A–N, each of the fourteen characters which make up this character set begin with a prominent positive signal peak at its right most edge. Also, each character cell includes at least three quiet or empty zones at its left most side. And finally each character ends with a prominent negative signal peak which immediately precedes the above mentioned quiet zone. By definition of the E13B standard, each of the fourteen character waveforms exhibit these three characteristics. The present invention uses these characteristics to locate each character as its signal is read by first detecting the beginning positive peak, then detecting the quiet zone at the end of the character, and finally by looking back at the signal to locate the ending negative peak relative to its quiet zone.

Once the character is located as described above, the approximate length of the character is determined by calculating the approximate space between the positive beginning peak and the ending negative peak. Because the speed of the check is known to be within a certain tolerance, the length of the character can be calculated within that same tolerance. This approximate length is compared with the known length of the characters which make up each of the four subgroups described above to identify the only two subgroups in which that character most likely resides. This comparison allows two of the subgroups of characters to be eliminated from consideration which, as mentioned above, simplifies the character recognition process and reduces the chances of a substitution error. Thus, it may be determined that the given character is of a length which fits in either the first or second subgroup, or the second or third subgroup, or the third or fourth subgroup.

Still referring to FIGS. 3A–N, a more detailed explanation of how the approximate length of the character is determined will now be described. In one preferred embodiment of the present invention, the electrical signal waveform for each character is sampled by processor 38 at a constant rate of approximately 100 samples per character cell as it is read by read head 28. Therefore, each cell zone is sampled approximately ten times. By indexing the beginning positive peak which corresponds to the beginning of the character and the ending negative peak which corresponds to the end of the character, the approximate length of the character is determined by calculating the number of samples between the beginning peak and the ending peak. Each of the subgroups, as mentioned above, is made up of characters which have a length of 4, 5, 6, or 7 zones which would correspond to approximately 40, 50, 60, or 70 samples. Because the speed at which the check moves through the apparatus is kept within a tolerance of ±10%, the number of samples obtained for any given character varies within that same tolerance as compared to the expected number of samples for that character. Therefore, for any given character, the number of samples actually counted when compared to the expected number of samples for each subgroup of characters allows only two possible subgroups to fall within the known tolerance.

Once the field of possible characters has been narrowed to two subgroups, the unique signal of the character in question is compared with the stored attributes of the characters within the two possible subgroups as follows and as will be described in more detail hereinafter. First, the locations of the signal peaks are compared with each of the characters within the two subgroups. Also, the position of any quiet zones are verified. Next each of the stored characters within the two identified subgroups is scored according to how closely it matches the character in question. The character in question is then identified by selecting the best scoring stored character. And finally, the read character is checked according to a specific set of rules to verify that it is indeed the selected stored character. At this point the identified character is output for its intended use.

Another feature of the present invention is the character recognition circuit's ability to store and process the unique attributes of the expected waveforms illustrated in FIGS. 3A–N in a compressed form. The signal waveform provided to the character recognition circuit is also compressed in a similar way. By storing and processing the character attributes in this compressed form, the present invention reduces the required processing time and required storage space. This allows a device in accordance with the present invention to use a simpler, less expensive processor and a smaller, less expensive memory storage device.

Figure 6:
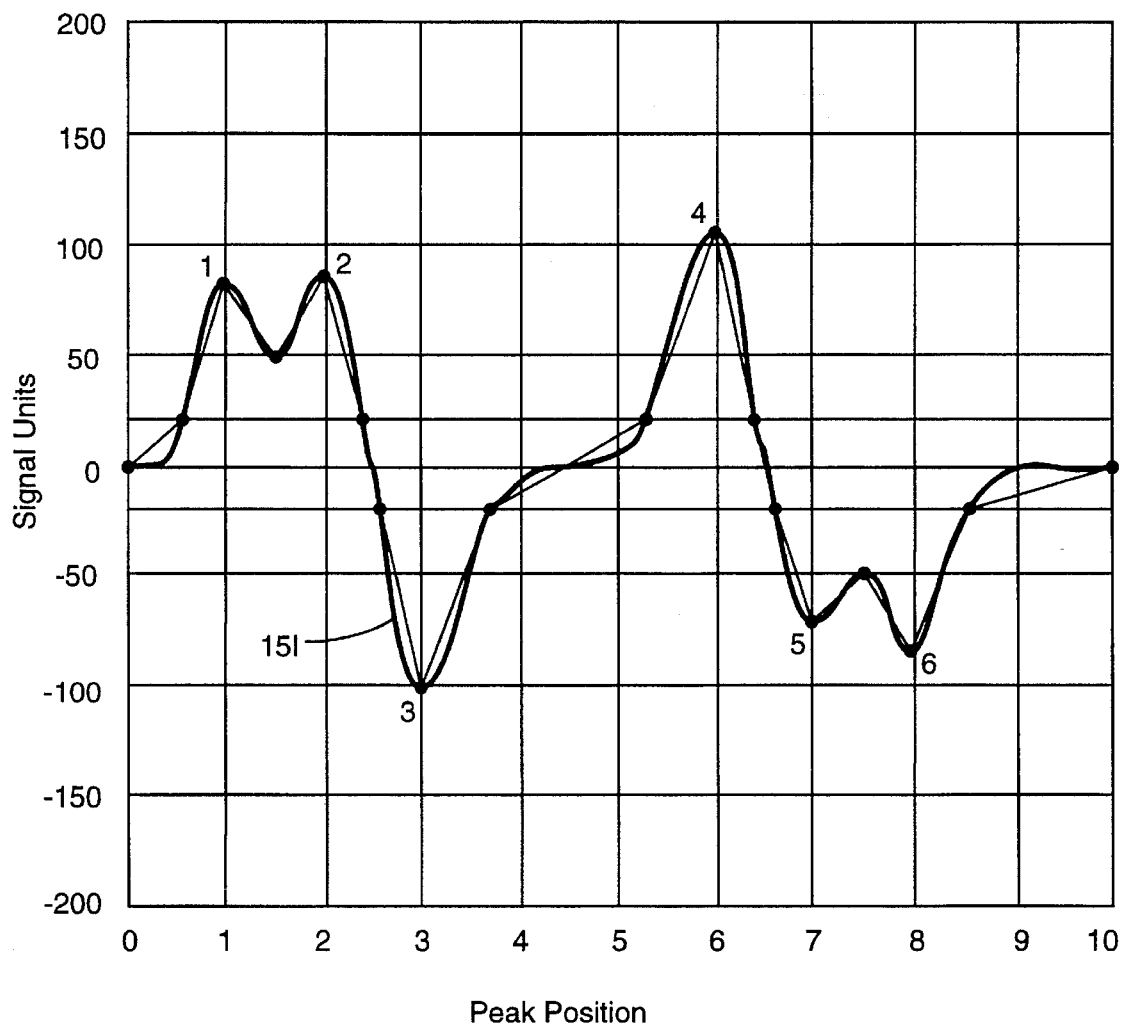
FIG. 6 is one example of a graph of vectors which represent the peaks of the waveform shown in FIG. 3I.
Figure 7A:
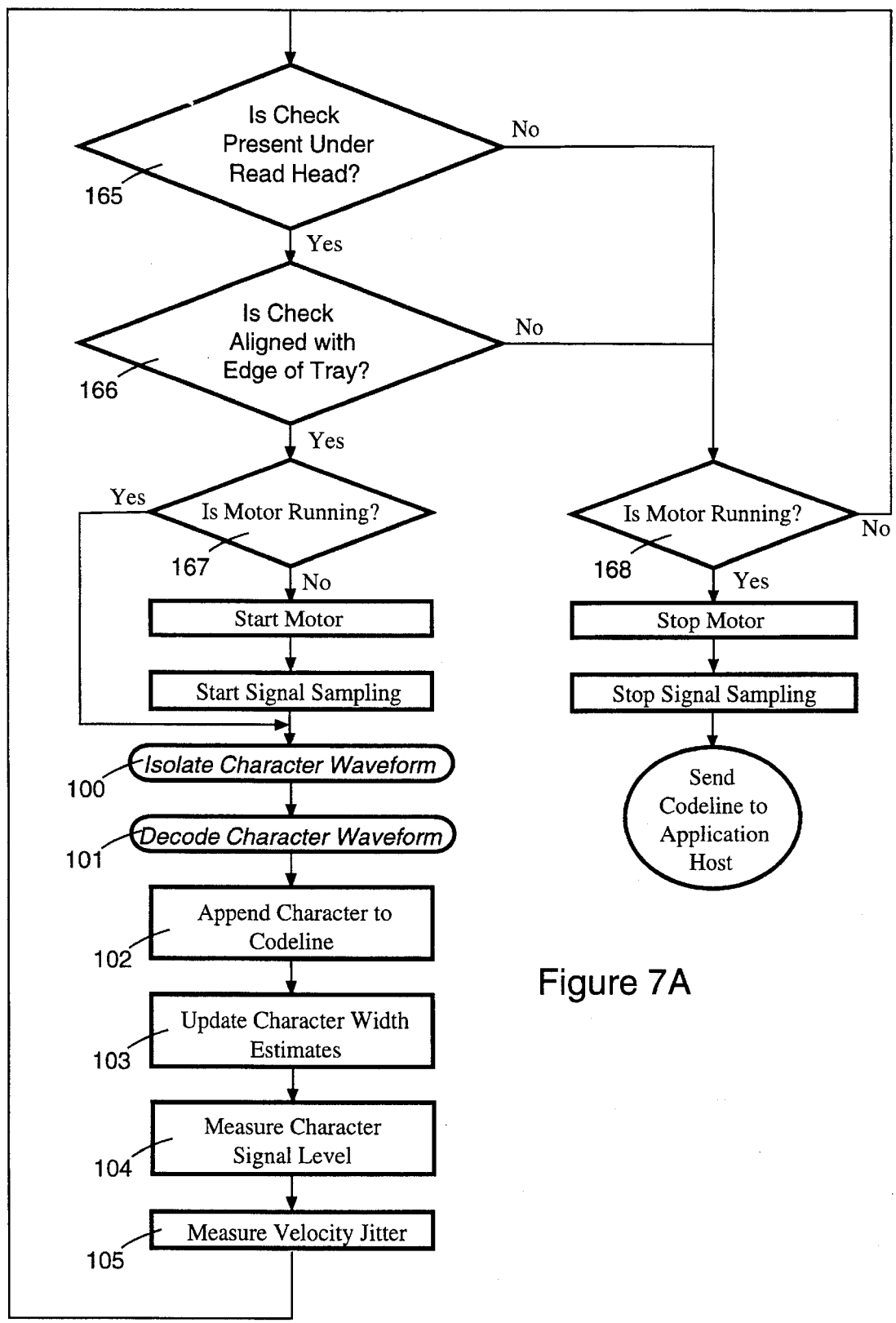
FIGS. 7A–M is a flow chart of the character recognition arrangement.
Figure 7B:
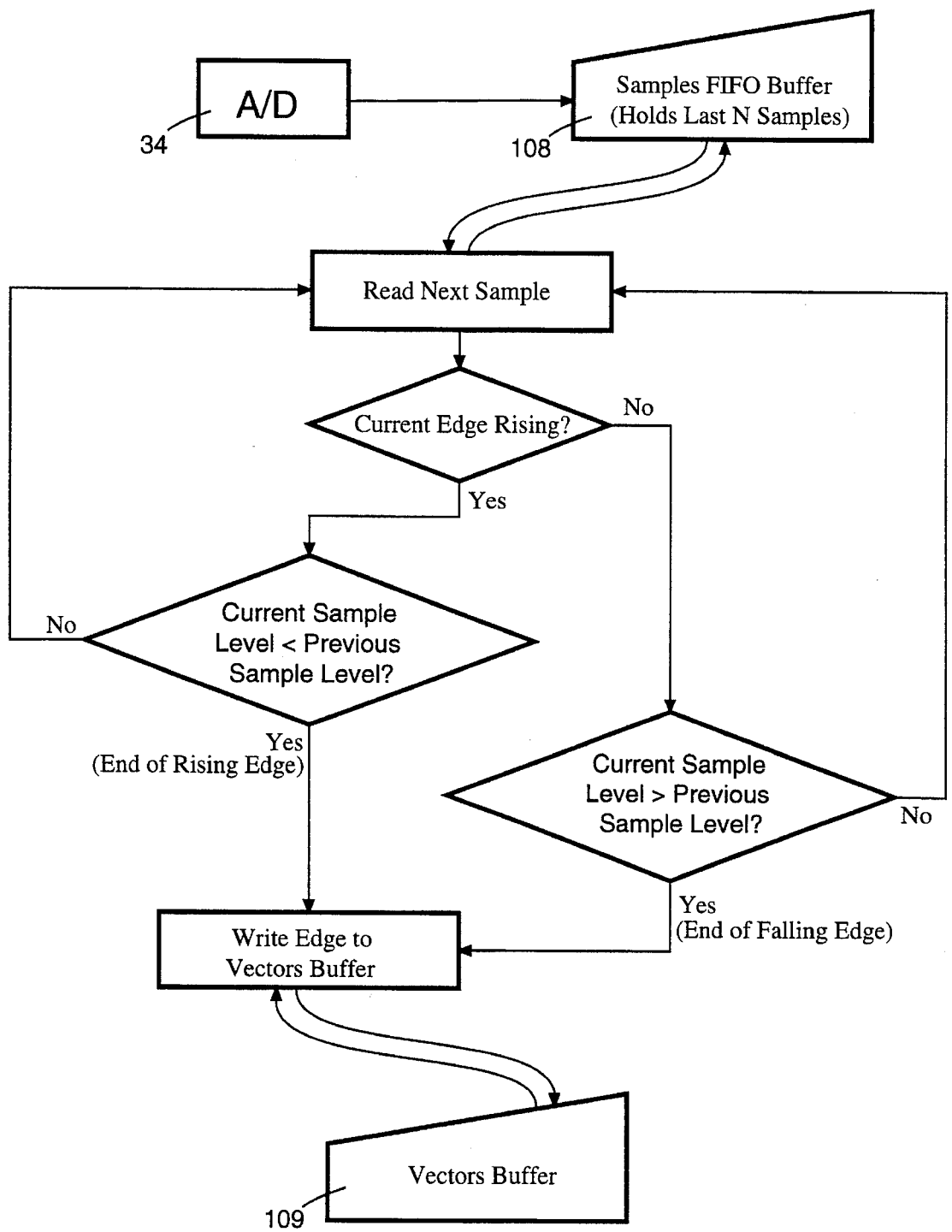
Figure 7C:
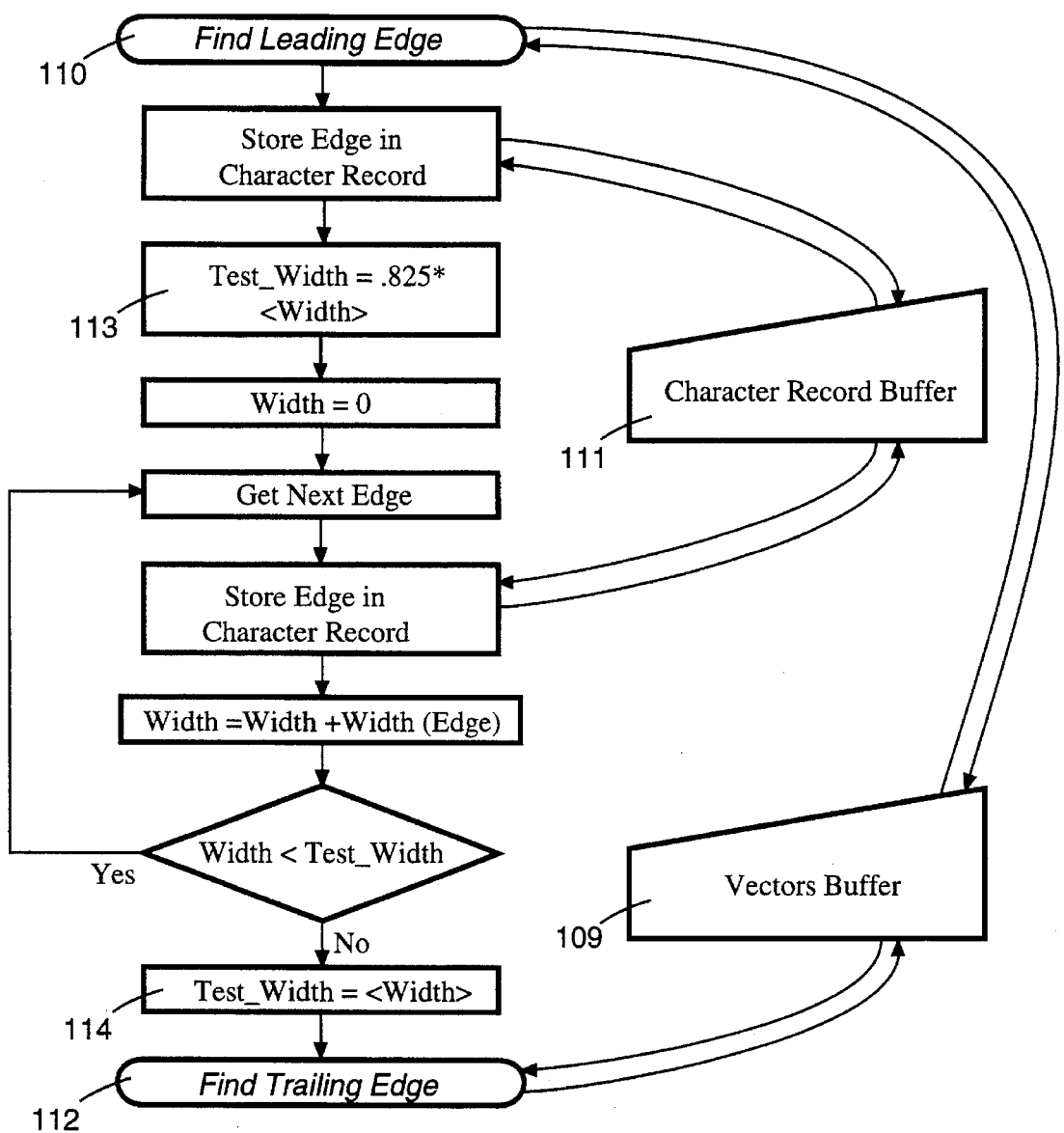
Figure 7D:
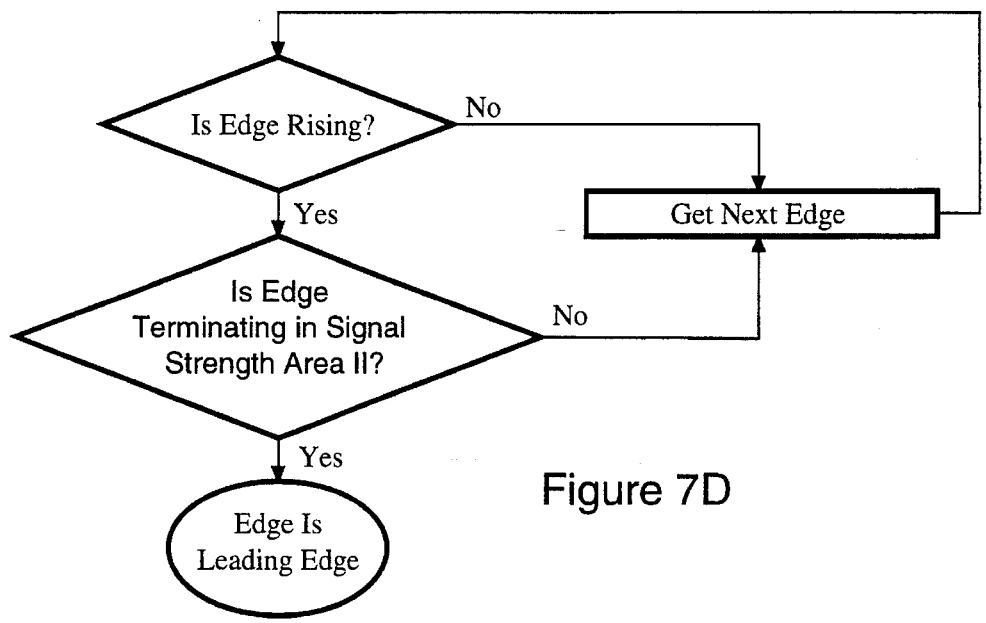
Figure 7E:
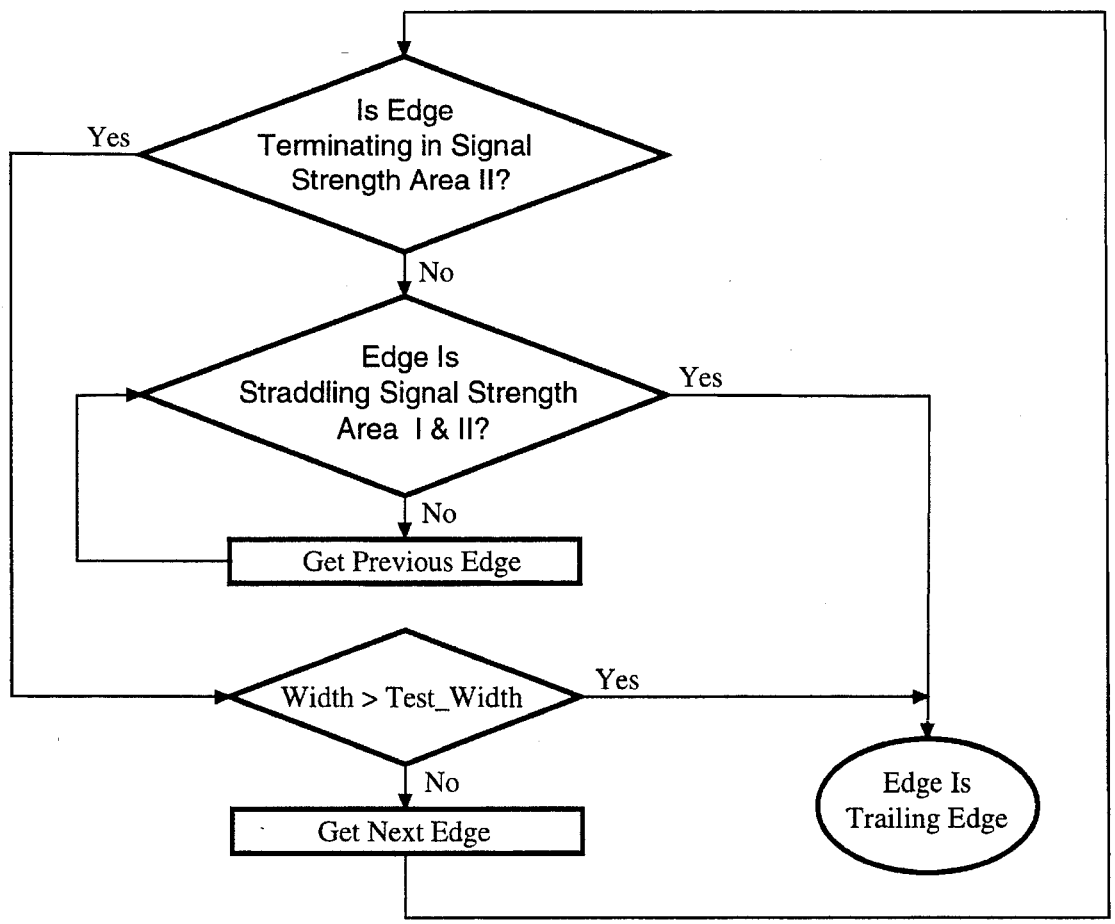
Figure 7F:
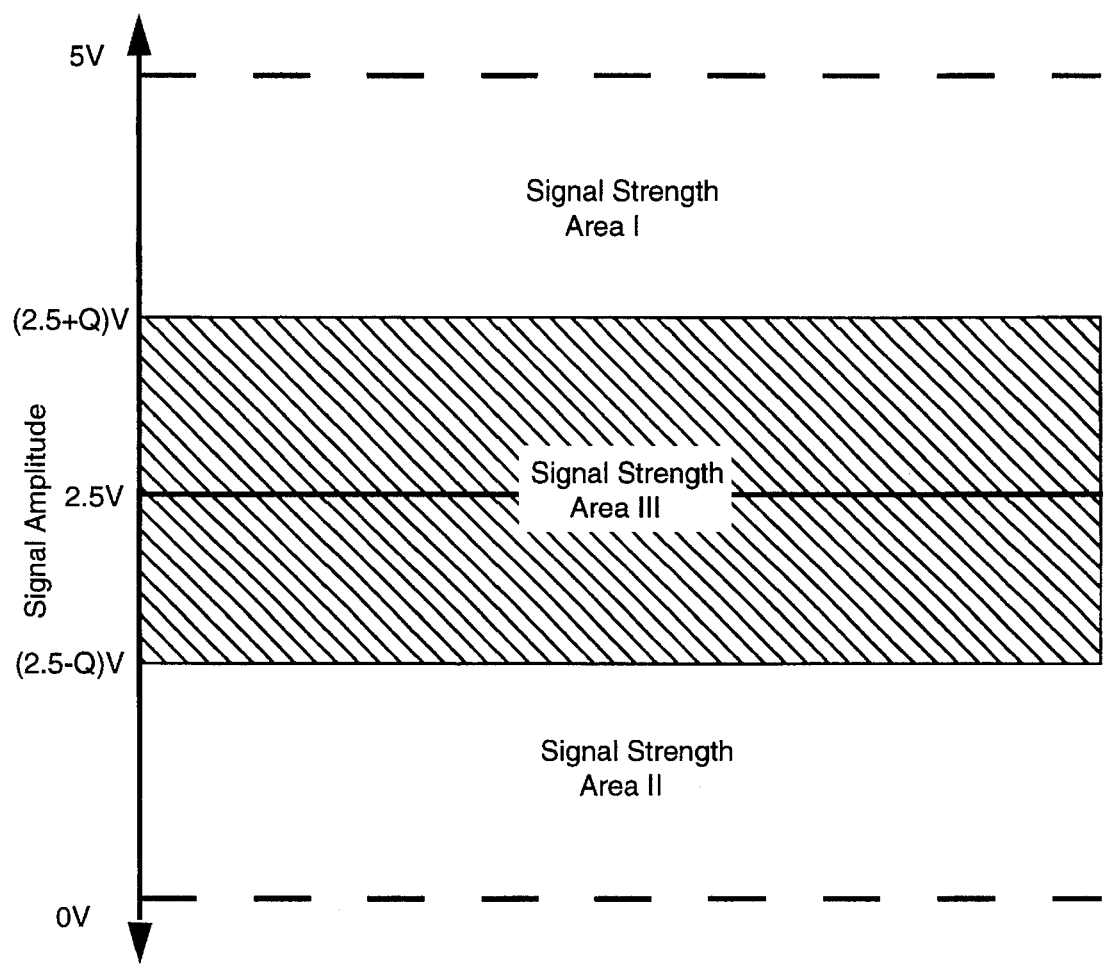
Figure 7G:
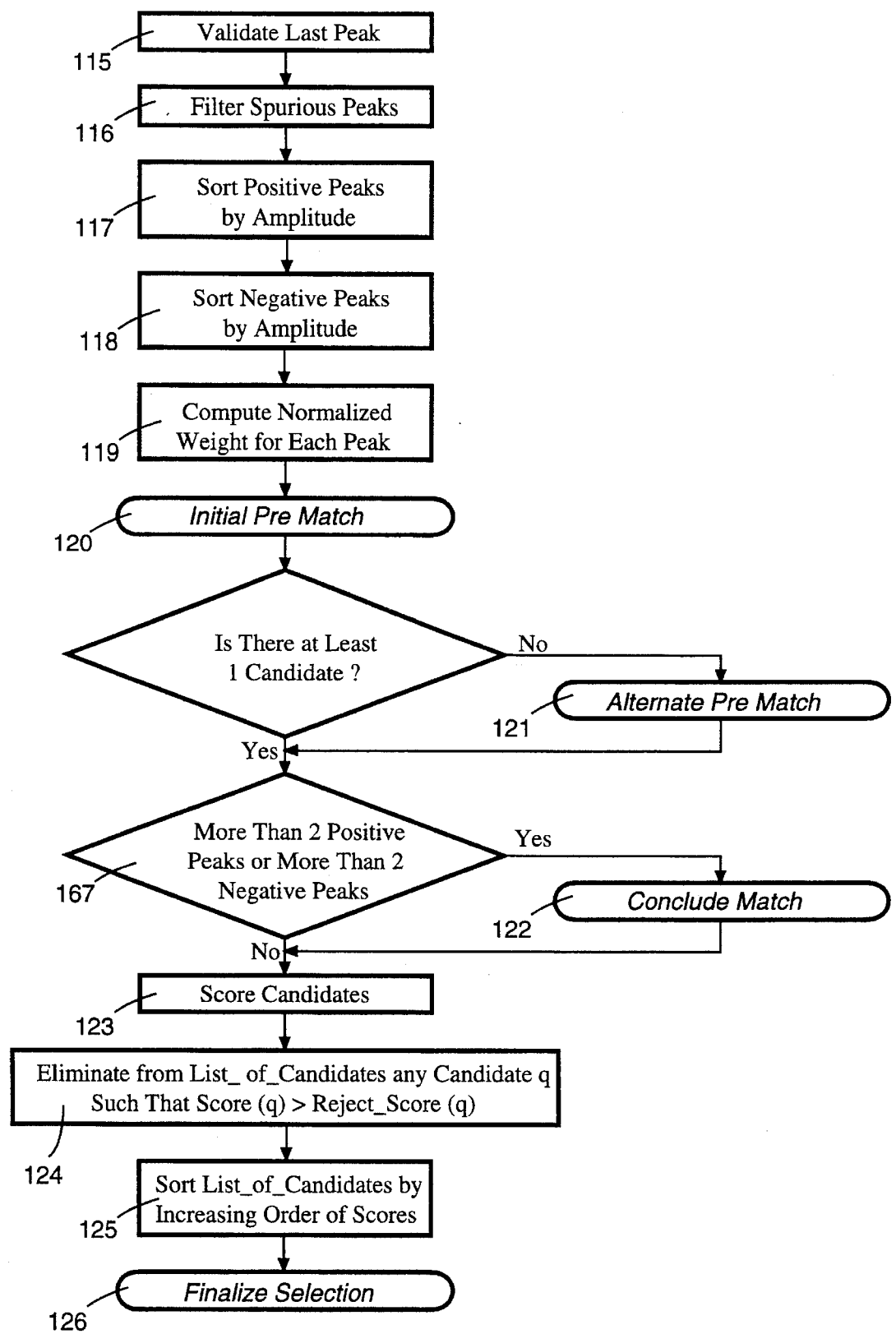
Figure 7H:
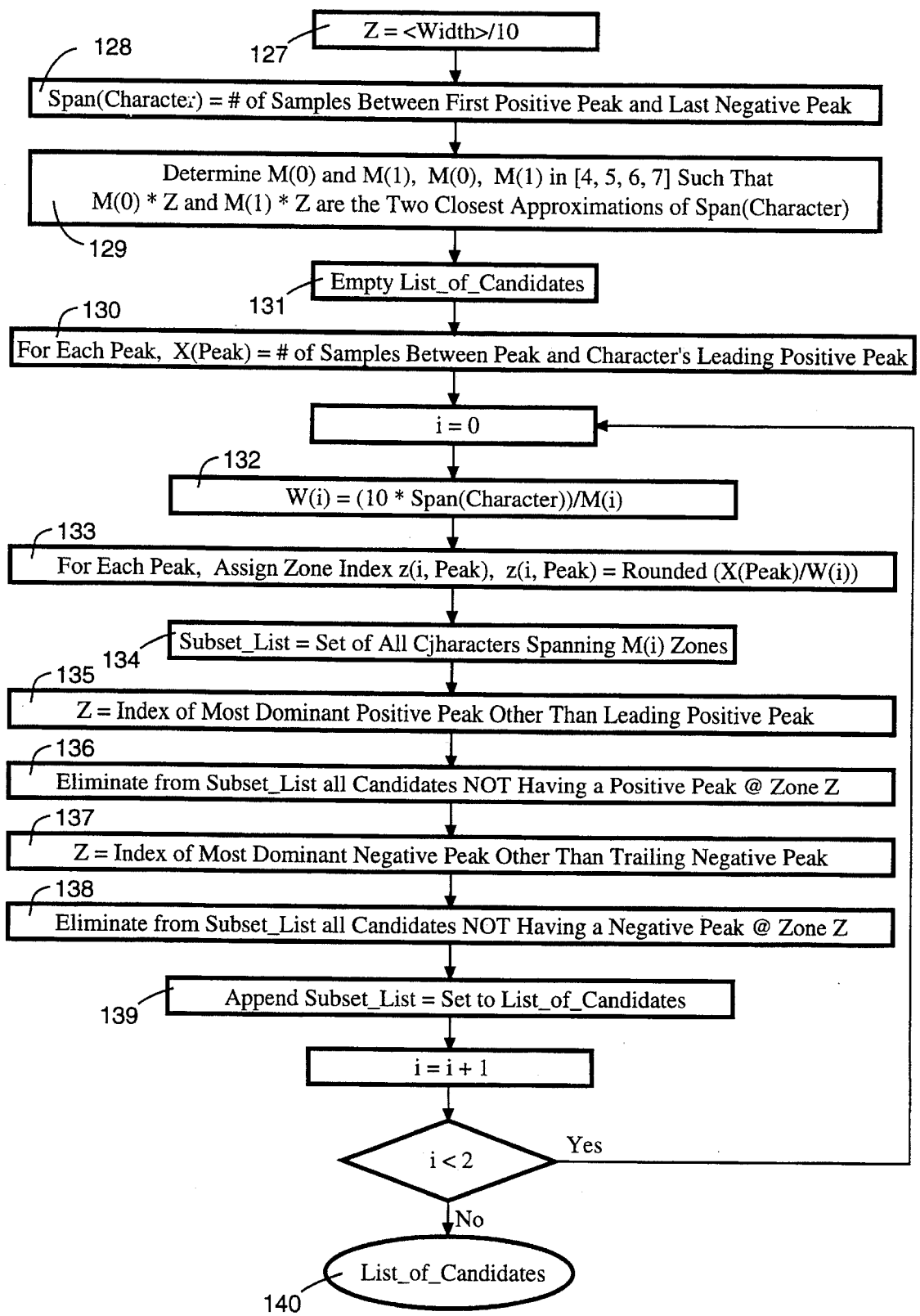
Figure 7I:
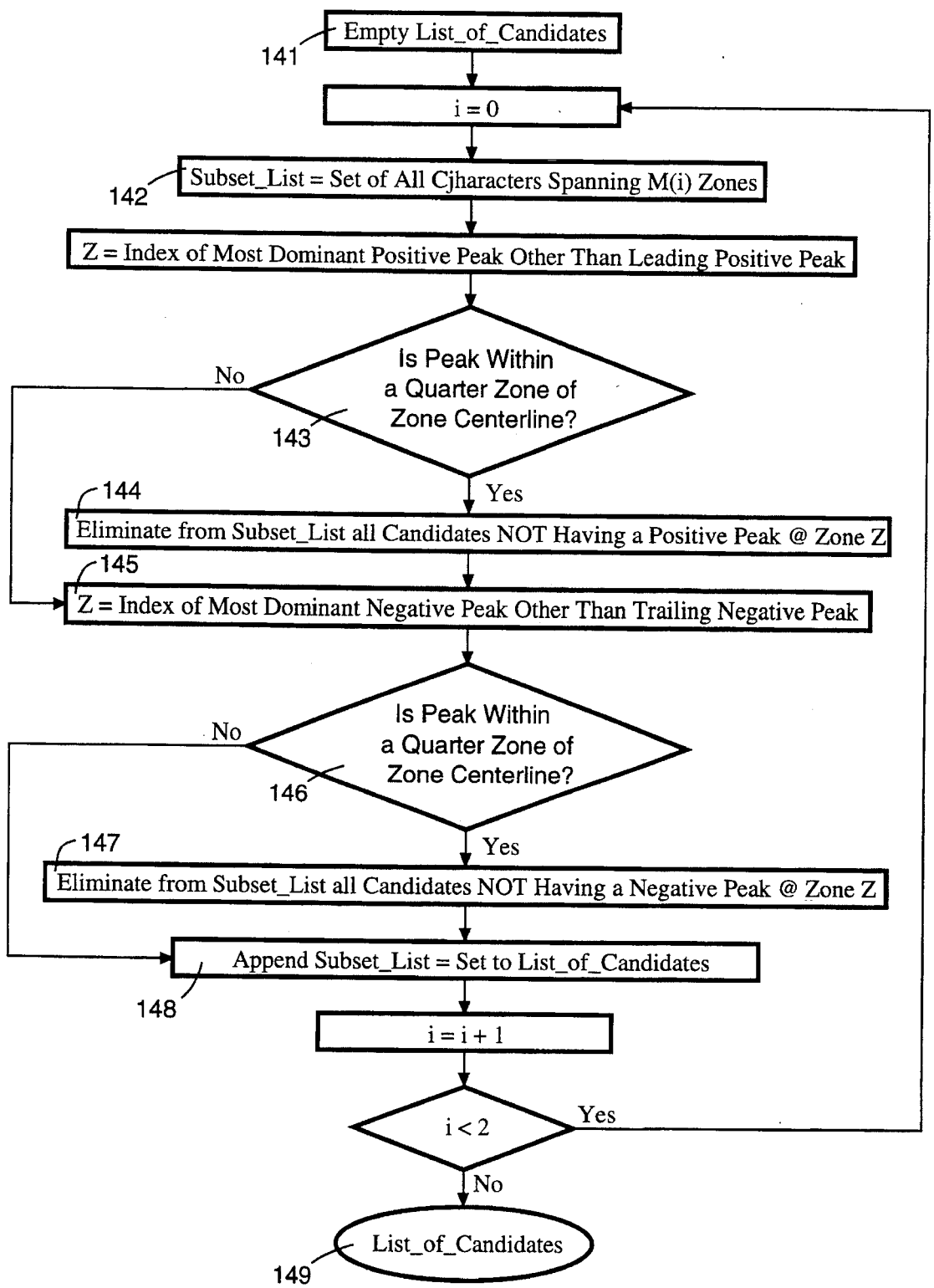
Figure 7J:
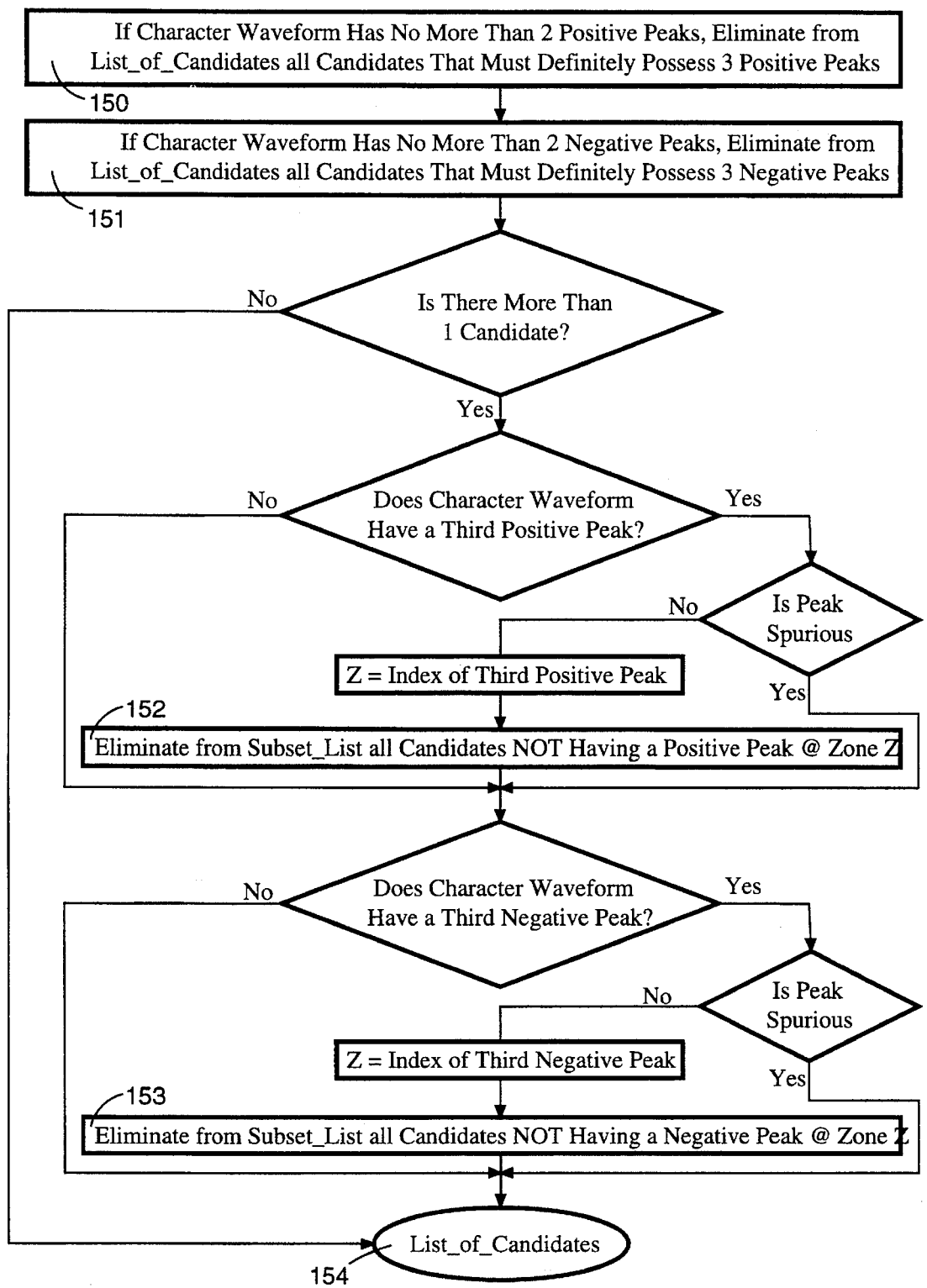
Figure 7K:
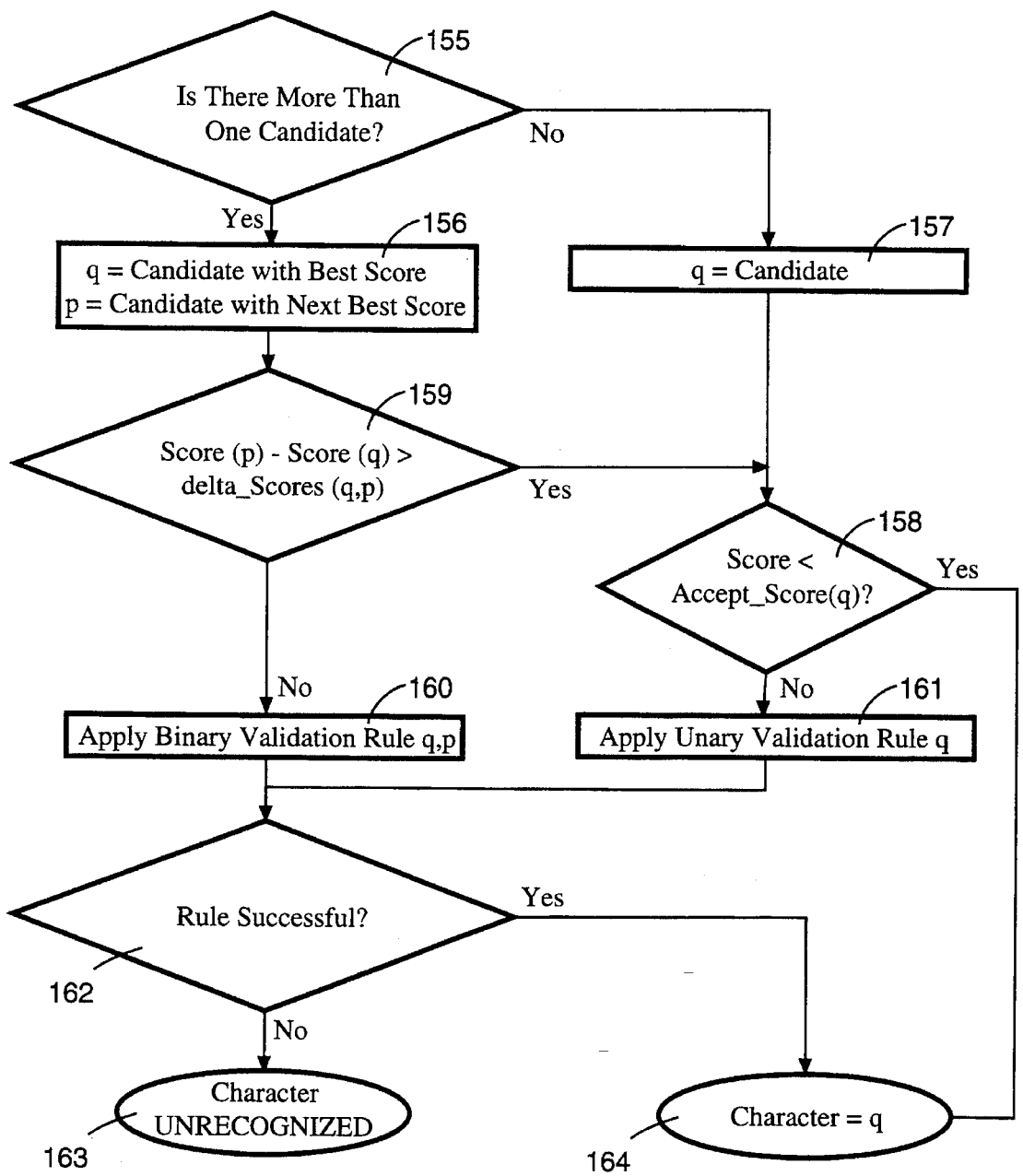
Figures 7L, 7M:
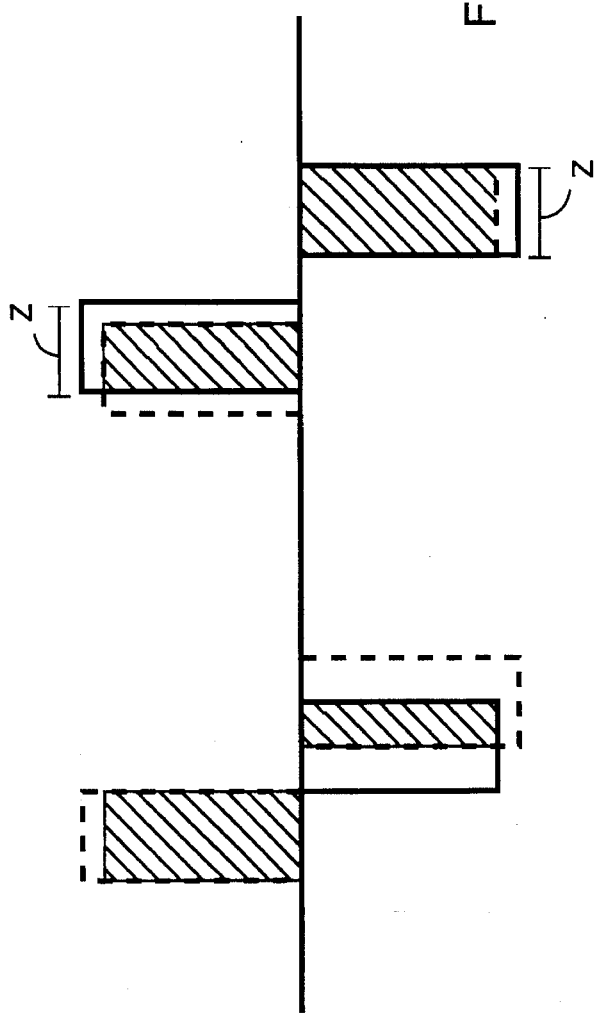

The preferred embodiment of the present invention compresses the unique waveforms of each character in the following way. Referring back to FIG. 5, as each character is processed by processing circuit 30, character recognition circuit 36 samples A/D converter 34 at a certain rate. From these samples, character recognition circuit 36 determines if signal 26 has a positive slope, has a negative slope, is in transition from a positive slope to a negative slope, or is in transition from a negative slope to a positive slope. As each transition point is located, a vector is created which defines that signal peaks location, magnitude, and direction (either positive or negative). Each character includes at least two positive and two negative peaks which are converted into vectors representing those peaks. These vectors are called digitized vectorizations of the waveforms they represent and they contain all of the relevant information about that waveform. FIG. 6 illustrates one example of the idealized vectors which represent the expected signal waveforms shown in FIGS. 3I, which corresponds to the number eight. These digitized vectorizations of the possible characters are stored in memory 40 and serve as the attributes respectively unique to the possible characters. These attributes are stored in the same four subgroups recited above. The advantage to using digitized vectorizations of the waveforms is, as stated above, the fact that they can be processed and stored in much less time and space compared to prior art approaches, thus allowing the use of a simpler, less expensive processor and less expensive storage device.

FIGS. 7A–M are a flow chart illustrating the steps character recognition circuit 36 follows to identify each of the characters as was described above. A more detailed description follows.

FIG. 7-A shows how the decoding logic is embedded in the overall circuitry. The check moving arrangement is equipped with two sensors, a head sensor which detects the presence of a check under the read head and an edge sensor which detects the presence of the stone check against the guiding edge of the apparatus housing. FIG. 7-A illustrates the logic used to determine the presence and proper alignment of a check introduced by the operator into the apparatus. To insure a proper registration of the check during its entire travel past the read head, both sensors must be checked periodically. For example, as shown on FIG. 7-A, both sensors are checked at a period corresponding with the full decoding cycle of one character which, in the preferred embodiment, amounts to a period varying anywhere between 15 milliseconds and 25 milliseconds.

Directing our attention to FIG. 7-B, the decoding logic continuously reads the waveform digital samples from the A/D converter 34 and is directed to do so under a conventional hardware interrupt arrangement at a rate of approximately 8,000 samples per second. This ram is fixed for every check reading apparatus but can be adjusted using a simple calibration scheme in such a way that the device nominally provides 100 samples per character, which corresponds to a spatial resolution of 770 samples per inch. The waveform digital samples are encoded on 8 bits and saved in a rotating buffer of N bytes 108 where N is a power of two. Buffer sizes of 32, 64, and 128 are typical recommended values. Rotating buffer 108 holds at all times the last N samples read from the A/D converter. Thus the sampling logic discards the oldest sample before writing the latest sample using a classical First In First Out (FIFO) strategy. The vectorization logic reads the samples from rotating buffer 108 and saves the vectors one after the other into a Vectors Buffer 109. Vectors are stored in a run-length/level fashion, using 16 bits per vector. The first 8 bits encode the length of the vector measured in number of elapsed samples. The next 8 bits encode the voltage level of the terminal sample value of each vector. Due to the inherent compression of the vectorization process, Vector Buffer 109 need not be bigger than 1,024 bytes to conservatively hold the complete vectorized waveform of an entire check. It has been empirically verified that the vectorization logic taught herein provides a compression ratio of approximately 8 on the average, no less than 5 in the worst case.

As stated above the waveform vectorization offers the economy of memory. In practical terms, this approach allows the implementation of the decoding logic on board of any micro controller offering internal random access (RAM) memory of as little as 1024 bytes without requiting the addition of external memory chips. Such micro controller devices are now readily available. Moreover, since such micro controllers customarily incorporate on chip A/D converter(s) and peripherals such as Universal Asynchronous Receiver(s)/Transmitter(s) for serial communication control, the above decoding logic allows for a one chip solution using an off-the-shelf micro controller chip, thereby avoiding the more costly application specific integrated circuit design (ASIC) cycle or more costly multiple chip architectures.

An added advantage of the vector encoding approach presented above is that it provides a natural parametrization of the waveform so as to allow unequivocal discrimination between the E13B character set and a CMC-7 character set. The CMC-7 character set represents individual character as a set of 7 bars. Each bar's vertical extent is customized so that the juxtaposition of the 7 bars provides a humanly readable character bit map and at the same time provide; a unique space width modulation signature when read by a magnetic head. As a result every CMC-7 character has a waveform exhibiting 7 dipoles, each dipole being made of a positive peak and a negative peak. Therefore, a simple accounting of the number of vectors present in the first character of any code line allows to immediately discriminate between both character sets without incurring any significant delay penalty.

Directing attention to FIG. 7-C, the decoding logic continuously monitors the Vectors Buffer 109 and analyzes each vector (also referred herein as an edge) to verify if it holds the attributes of an edge leading to the first valid peak of a character waveform. FIG. 7-D shows the logic used to identify such an edge. Referring back to FIG. 7-C, once a leading edge is found, it is stored in a temporary Character Record Buffer 111 where all subsequent vectors (edges) of the now started specific character waveform will be stored in turn. A control variable referred to as test_width in module 113 is then initialized at a value slightly in excess of 80% of the current estimate of the character cell size. All edges not extending the character waveform beyond a distance test_width away from the end of the first valid edge of the character waveform are then stored in the Character Record Buffer 111. The value of test_width has been chosen so as to guarantee that all edges belonging to the character waveform under analysis will be isolated and stored in the Character Record Buffer 111. Indeed, as already discussed, assuming a constant transport velocity, the widest character would not extend beyond 70% of the character cell size, starting the measurement from the top of the leading edge as indicated above. Therefore, the factor of 0.825 allows for worst case transport speed variations of up to ±125/0.7= ±175/10=±17.5%. This provides a conservative margin when an inexpensive DC motor is used in an open loop arrangement, as is in the preferred embodiment. Indeed, typical relative speed variations of such drive mechanism and electronics circuitry can be contained below ±10%. At point 114 on FIG. 7-C, all edges belonging to the character waveform under analysis have been isolated and stored in the temporary Character Record Buffer 111. The control variable test_width is then set at a new value corresponding to the current estimate of the character cell size. The decoding logic then engages in validating the trailing edge of the character waveform. FIG. 7-E shows the logic of this latter process which ensures that the isolated character waveform will be properly bounded to its right by the trailing negative peak and will not unnecessarily extend within the ensuing quiet zone.

At the entry of logic module 101 the Character Record Buffer 109 contains a single isolated character waveform that we can now proceed to decode. Now turning attention to FIG. 7-G, a few preliminary steps are taken to further condition the character waveform. Logic module 115 further verifies the validity of the last negative peak. It checks that this peak is dominant among all negative peaks of the latter half of the character waveform thereby ruling out any peak that would have emerged from spurious noise. Module 116 then eliminates other spurious peaks within the body of the character waveform itself. Two fundamental principles are used here. First, all peaks of the same polarity are analyzed. If two positive (negative) peaks fall within the confines of the same zone, the strongest one is selected if it is substantially dominating, or both peaks are averaged if they are sensibly of the same strength. Second, peaks of opposite polarity are checked against one another. If two peaks of opposite polarity fall within the confines of the same zone, the dominant one (i.e. the one furthest away from the baseline) is selected and the other one eliminated. Modules 115 and 116 increase the immunity of the character vectorized waveform and the corresponding validated peaks with respect to commonly observed signal noise as generated by such imperfections as noisy edges, broken strokes, and irregular ink application. The final set of positive (negative) peaks are then sorted in decreasing (increasing) order of the voltage level measured at their apex in module 118 and 119 respectively. Then logic module 120 proceeds to associate to each peak a normalized weight value proportional to the relative strength of the peak among the set of all other validated peaks. This provides a gain independent measure allowing for the proper registration and scoring of the unknown character waveform with the predetermined idealized template waveform stored in memory. At the exit of module 119, the decoding logic has completed the character waveform conditioning, normalization, and feature extraction, and is ready to engage in the decoding per se.

The decoding logic follows progressive steps to be summarized hereafter. The fast step is implemented in logic module 120 where the first two dominant positive peaks and the first two dominant negative peaks are used to narrow down the set of valid candidates. Logic module 122 then refines the selection using the third positive peak, if available, and the third negative peak, if available. Module 123 computes a matching score for each of the surviving candidates. Module 124 then proceeds to reject all those candidates for which the score exceeds a specific value referred to as reject_score. Module 125 sorts the remaining candidates in increasing order of their score, a smaller score indicating a better match. Finally module 126 undertakes the final selection and validation. Should module 120 terminate with no valid candidate due to the misalignment of either the second positive peak or the second negative peak, module 121 provides an alternative logic requiring better alignment of these peaks with their zone centerline before making use of them in pairing down the current set of candidates.

Describing each of these steps in further detail, attention is directed to FIG. 7-H. First, module 127 computes the variable Z which represents the average number of samples in a zone, alias the zone width, as a tenth of the current estimate of the character cell width. Variable Z is determined within one decimal digit after the decimal point so as to eliminate round off errors for all practical purposes. Module 128 then determines the distance between the apex of the leading positive peak in the character waveform and the apex of the Wailing negative peak in the same waveform. Ideally this distance should equal an exact multiple of the variable Z, with a multiplier equal to either 4, 5, 6, or 7. In practice, due to transport velocity variations, positioning aberrations, and numerical rounding errors, such a relationship will not hold exactly. Therefore, module 129 determines the two multipliers M(0) and M(1), M(0) and M(1) taking one of the values in {4,5,6,7}, such that the products M(0) * Z and M(1) * Z provide the two closest approximations to the aforementioned leading peak to trailing peak distance and referred to in module 128 as span (character). The decoding logic then proceeds to two iterations through the program loop defined by modules 132 through 139.

The first iteration uses the multiplier assumption M(0) whereas the second iteration uses the multiplier assumption M(1). For each iteration, it is assumed that all candidates belonging to the corresponding E13B character subgroup (these sets were enumerated above) are likely candidates. The list of candidates is then paired down by eliminating those candidates which do not exhibit a second dominant positive/negative peak at the same zone as the character waveform under analysis. Upon completion of the second iteration of the aforementioned program loop, all yet valid candidates are present in an array of memory locations referred to as List_of_candidates in module 140. Should the list be empty, an alternate path through module 121 is then taken as indicated by the program flow shown in FIG. 7-G. FIG. 7-I provides the details for logic module 122. It is, in essence, very similar to logic module 120 except for the further requirement imposed by modules 143 and 146. These modules require that the peak be more accurately located with respect to the zone centerline (within a quarter of a zone left or right from the centerline) before the corresponding peak be used as a discrimination feature.

Referring back to FIG. 7-G, at the entry of module 167, the leading positive peak and the next dominant positive peak as well as the trailing negative peak and the next dominant negative peak have been used to pair down the number of candidates. As a result, List_of_candidates might comprise anywhere from a single candidate up to 4 candidates. Should the character waveform exhibit a valid third negative peak or a valid third positive peak, further selection can occur on the basis of this third peak(s). This is done in logic module 122 of which details are provided in FIG. 7-J. Thus turning attention to FIG. 7-J, modules 150 and 151 insure that all candidates that are characterized by a number of positive (negative) peaks in excess of the number of positive (negative) peaks of the character waveform under analysis be eliminated. Then if List_of_candidates yet contains more than one candidate, the third positive peak, if available and valid, and the third negative peak, if available and valid, are used to continue the selection.

Turning now to FIG. 7-K, the purpose of this final logic module referred to as module 126 on FIG. 7-G is to further select, if necessary, and then validate the final candidate. A key objective pursued here is to guard the decoding logic from substitution errors in as much as the character waveform represents a substantially distorted waveform of its idealized template but yet does not substantially resemble the idealized waveform of any one of the other 13 idealized templates.

An explanation of the derivation of the matching score performed by module 123 shown on FIG. 7-G is now in order. Both the idealized (template) character waveform of the relevant candidate as shown in FIG. 3-A through FIG. 3-N and the measured character waveform are further modeled as a bar chart as illustrated in FIG. 7-L. Each bar is assigned a width of Z, as defined by module 127 on FIG. 7-H and a height corresponding to the normalized weight of the corresponding peak. The bar representing the first positive peak and the bar representing the last negative peak are then brought into exact correspondence between the measured and template waveforms by normalizing the X-axis. The score is then computed as 100% minus the percentage of total area represented by the intersection between both bar charts. As a result, a small score represents a good match, a high score a bad match. FIG. 7-M further provides an example of the scoring process in numerical form.

Taming back to FIG. 7-K, three arrays of scores are referenced, the one dimensional array accept_score (.) used in logic module 158, the one dimensional array reject_score (.) used in logic module 124, FIG. 7-G, and finally the two dimensional array delta_scores (.)(.) used in logic module 159. The accept_score (.) array is to be understood as follows. If the character waveform under analysis obtains a score S against the template waveform q such that S<accept_score(q), then it is certain in probability that the character waveform represents character q. In probabilistic terms, accept_score(q) represents the infimum of the set {score(w(p)), p!=q, where w(p) represents any measured waveform of character p}. The reject_score (.) carries the complementary meaning. If the character waveform under analysis obtains a score S against the template waveform q such that S>reject_score (q), then it is certain in probability that the character waveform does NOT represent character q. In probabilistic terms, reject_score (q) represents the supremum of the set {score(w(q)), where w(q) represents any measured waveform of character q}. Finally the delta_scores(. , .) array is to be understood as follows. If the character waveform under analysis obtains a score Sq against idealized template q and a score Sp against idealized template p, if moreover q and p are two candidates for the character waveform under analysis, and finally if Sq<Sp+ delta_score (q, p), then it is certain that the character waveform does NOT represent character p. For the presently preferred embodiment of the present invention, these arrays were estimated using a set of 140,000 waveforms, about 10,000 samples for each of the 14 characters in the character set, gathered from a set of checks as diversified as possible.

With these definitions in mind, FIG. 7-K is now described. If the candidate is unique, the task consists in validating the selection as thoroughly as possible. Module logic 158 checks if the score warrants any further validation. If such is the case, that is if accept_score (q)<=score<=reject_ score (q), then logic module 161 submits the waveform to a validation rule specific to character q. If there are multiple candidates, module 159 verifies the contrast between the scores of the best two candidates. If the contrast is sufficient, we are back to the previous case, considering candidate q as unique from now on. Otherwise, logic module 160 submits the waveform to a validation rule specifically customized to enhance the discrimination of waveform q versus waveform p. Unary and binary validation rules test specific peak level ratios as well as the existence of the required quiescent zones as prescribed by each individual idealized waveform.

Now turning attention back to reference point 106 on FIG. 7-A, the character just recognized is appended to the code line buffer in logic module 102. Then the character average width estimate is updated as the average between the width of the character just recognized and the previous character average width estimate in module 103 using a conventional fast recursive average update. Module 104 measures the character signal level as prescribed by ANSI standard X3.2. Finally module 105 estimates the velocity jitter which took place between the previous and the current character. At that point the decoding logic returns control to the main idle loop which reiterates its various tests through modules 165, 166, 167, and 168 and calls the decoder over again or concludes the reading process as the case may be.

As was mentioned above, the present invention has the additional advantage that an apparatus designed in accordance with the present invention can discriminate between the E13B character set and the character set referred to as the CMC-7 character set. If a CMC-7 character is encountered the character recognition circuit automatically switches to compare the read character to the stored attributes of the CMC-7 character set. Thereafter, the CMC-7 character is identified in accordance with the prior art as contrasted with the recognition circuitry of the present invention. This prior art circuitry is incorporated into character recognition circuit 36. This gives the present invention the rather unique ability to read both character sets without any operator input.

Although only one embodiment of the present invention has been described, it should be understood that the present invention may be embodied in many other specific forms without departing from the spirit or scope of the invention. Particularly, the present invention would apply to other character sets which have a predetermined, standardized design. Although the present invention has been described as being a character recognition device for recognizing characters printed on a bank check, it should be understood that the present invention would equally apply to documents other than bank checks. Also, the character recognition method could be equally applied to an optical character recognition system. Furthermore, the above described embodiment divides each cell into approximately 100 sample areas. It should be understood that a wide variety of approximate numbers of sample areas may be used depending on the requirements of the application.. Also, the present invention subdivides the group of characters into four subgroups. Again, a wide variety of numbers of subgroups might be contemplated depending on the specific characteristics of the character set being utilized.

Therefore, the present examples are to be considered as illustrative and not restrictive, and the invention is not to be limited to the details given herein, but may be modified within the scope of the appended claims.

What is claimed is:

1. An apparatus for reading a series of characters which are preprinted in a certain way and within a predetermined area on a bank check, each of the characters within said series of characters may be any character from a specific group of characters which are divided within the group into at least three subgroups, said apparatus comprising:

(a) an apparatus housing defining a specific path through which said check, oriented in a predetermined way, is intended to pass during normal operation of the apparatus;

(b) means including a read head supported within said housing at a fixed read point adjacent said path for sensing each said characters at said read point as said check, oriented in said predetermined way, is caused to move through said path and for producing an electric signal unique to each character;

(c) an arrangement for automatically moving said check, oriented in said predetermined way, through said path without the manual assistance of an operator at a speed which is intended to be constant but which may vary randomly, whereby to produce said electrical sights as said characters move past said read point; and (d) character recognition means connected with said read head and responsive to said electrical signals for identifying maid characters without monitoring the precise speed of said check as it moves through said path, even when said check moves through said path at a random varying speed, so long as the variation in speed of the check stays within certain tolerances, said character recognition means including means for storing certain attributes respectively unique to the various characters making up said specific group and means for identifying any one of said characters within said series by (i) first identifying the only two subgroups within which that one character most likely resides, thereby eliminating from consideration the other subgroup or subgroups making up the specific group, and (ii) thereafter comparing the one character's unique electrical signal to the stored attributes of those characters within the two identified subgroups only without comparing the one character's unique electrical signal to the stored attributes of those characters within the other subgroups.

2. An apparatus according to claim 1 wherein the predetermined area on said check within which said series of characters are preprinted is divided into a set of adjacent cells, one for each character, wherein each cell is divided into a plurality of equal zones, wherein the characters common to each of said subgroups of characters physically take up the same number of zones within a cell, which number differs for each subgroup, and wherein said means for identifying any one of said characters includes means for approximating the number of cell zones the one character takes up within its particular cell in order to identify the only two subgroups within which that one character most likely resides.

3. An apparatus according to claim 2 wherein said specific group of characters are divided into four subgroups, wherein each of said cells is divided into ten zones, wherein each of the characters within the fast subgroup occupies the last four zones within its cell, wherein each of the characters within the second subgroup occupies the last five zones within its cell, wherein each of the characters within the third subgroup occupies the last six cell zones within its cell, wherein each of the characters within the fourth subgroup occupies the last seven zones within its cell and wherein said means for approximating the number of cell zones the one character takes up within its particular cell in order to identify the only two subgroups within which that one character most likely resides includes means for measuring at least approximately the occupied zones within the cell or the length of said one character.

4. An apparatus according to claim 3 wherein said characters are magnetic characters including the numbers 0 through 9 and special characters referred to as AMOUNT, ON-US, TRANSIT, and DASH.

5. An apparatus according to claim 4 wherein said four subgroups of characters include a first subgroup containing the characters 1 and 2, a second subgroup containing the characters 3, 5 and 7, a third subgroup containing the characters 4, 6 and 9, and a fourth subgroup containing the characters 0, 8, AMOUNT, ON-US, TRANSIT, and DASH.

6. An apparatus according to claim 1 wherein the electrical signal unique to each character is an analog waveform and wherein said means for storing certain attributes respectively unique to the various characters making up said specific group includes means for storing a digitized vectorization of the analog waveform of each character, said waveform including a plurality of waveform peaks, said digitized vectorization including a plurality of vectors representing the location, magnitude, and direction of at least some of said waveform peaks, and each digitized vectorization serving as the unique attribute for its associated character.

7. An apparatus according to claim 6 wherein said means for identifying said one character within said series includes means for converting the analog waveform of said one character to a digitized vectorization of that waveform and comparing this latter digitized vectorization to the stored attributes of those characters within the two identified subgroups.

8. An apparatus fix reading a series of characters which are preprinted in a certain way and within a predetermined area on a bank check, each of said characters being any character selected from a specific group of characters which are divided within the group into at least three subgroups, said apparatus comprising:

(a) an apparatus housing which defines a specific path through which said check, oriented in a predetermined way, is intended to pass during normal operation of the apparatus;

(b) means including a read head supported within said housing at a fixed read point adjacent said path for sensing each of said characters at said read point as said check, oriented in said predetermined way, is caused to move through said path and for producing an electric signal unique to each character;

(c) an arrangement for automatically moving said check, oriented in said predetermined way, through said path at a speed which is intended to be constant but which may vary randomly, whereby to produce said electrical signals as said characters move past said read point; and (d) character recognition means connected with said read head and responsive to said electrical signals for identifying said characters without monitoring the precise speed of said check as it moves through said path, even when said check moves through said path at a random varying speed, so long as the variation in speed of the check stays within certain tolerances, said character recognition means including (i) means for storing certain attributes respectively unique to the various characters making up said specific group and (ii) means for identifying any one of said characters within said series by first identifying the only two subgroups within which that one character most likely resides, thereby eliminating from consideration the other subgroup or subgroups making up the specific group, and thereafter comparing the one character's unique electrical signal to the stored attributes of those characters within the two identified subgroups only without comparing the one character's unique electrical signal to the stored attributes of those characters within the other subgroups.

9. An apparatus according to claim 8 wherein the predetermined area on said check within which said series of characters are preprinted is divided into a set of adjacent cells, one for each character, wherein each cell is divided into a plurality of equal zones, wherein the characters common to each of said subgroups of characters physically take up the same number of zones within a cell, which number differs for each subgroup, and wherein said means for identifying any one of said characters includes means for approximating the number of cell zones the one character takes up within its particular cell in order to identify the only two subgroups within which that one character most likely resides.

10. An apparatus according to claim 9 wherein said specific group of characters are divided into four subgroups, wherein each of said cells is divided into ten zones, wherein each of the characters within the first subgroup occupies the last four zones within its cell, wherein each of the characters within the second subgroup occupies the last five zones within its cell, wherein each of the characters within the third subgroup occupies the last six cell zones within its cell, wherein each of the characters within the fourth subgroup occupies the last seven zones within its cell and wherein said means for approximating the number of cell zones the one character takes up within its particular cell in order to identify the only two subgroups within which that one character most likely resides includes means for measuring at least approximately the occupied zones within the cell or the length of said one character.

11. An apparatus according to claim 10 wherein said characters are magnetic characters including the numbers 0 through 9 and special characters referred to as AMOUNT, ON-US, TRANSIT, and DASH.

12. An apparatus according to claim 11 wherein said four subgroups of characters include a first subgroup containing the characters 1 and 2, a second subgroup containing the characters 3, 5 and 7, a third subgroup containing the characters 4, 6 and 9, and a fourth subgroup containing the characters 0, 8, AMOUNT, ON-US, TRANSIT, and DASH.

13. An apparatus according to claim 9 wherein the electrical signal unique to each character is an analog waveform and wherein said means for storing certain attributes respectively unique to the various characters making up said specific group includes means for storing a digitized vectorization of the analog waveform of each character, said waveform including a plurality of waveform peaks, said digitized vectorization including a plurality of vectors representing the location, magnitude, and direction of at least some of said waveform peaks, and each digitized vectorization serving as the unique attribute fix its associated character.

14. An apparatus according to claim 13 wherein said means for identifying said one character within said series includes means for converting the analog waveform of said one character to a digitized vectorization of that waveform and comparing this latter digitized vectorization to the stored attributes of those characters within the two identified subgroups.

15. An apparatus for reading a series of characters which are preprinted in a certain way and within a predetermined area on a particular document, each of said characters being any character selected from a specific group of characters which are divided within the group into at least three subgroups, said apparatus comprising:

(a) an apparatus housing which defines a specific path through which said document, oriented in a predetermined way, is intended to pass during normal operation of the apparatus;

(b) means including a read head supported within said housing at a fixed read point adjacent said path for sensing each of said characters at said read point as said document, oriented in said predetermined way, is caused to move through said path and for producing an electric signal unique to each character;

(c) an arrangement for automatically moving said check, oriented in said predetermined way, through said path at a speed which is intended to be constant but which may vary randomly, whereby to produce said electrical signals as said characters move past said read point; and (d) character recognition means connected with said read head and responsive to said electrical signals for identifying said characters without monitoring the precise speed of said document as it moves through said path, even when said document moves through said path at a random varying speed, so long as the variation in speed of the document stays within certain tolerances, said character recognition memos including (i) means for storing certain attributes respectively unique to the various characters making up said specific group and (ii) means for identifying any one of said characters within said series by first identifying the only two subgroups within which that one character most likely resides, thereby eliminating from consideration the other subgroup or subgroups making up the specific group, and thereafter comparing the one character's unique electrical signal to the stored attributes of those characters within the two identified subgroups only without comparing the one character's unique electrical signal to the stored attributes of those characters within the other subgroups.

16. An apparatus according to claim 15 wherein said document is either a United States Bank check or a bank check from a particular foreign country, wherein said series of characters are provided in accordance with a specific U.S. standard in the case of the United States bank checks and a different, foreign standard in the case of bank checks from a particular foreign country, wherein said character recognition means identifies only U.S. characaters, and wherein said apparatus further includes means for automatically distinguishing between U.S standard characters and foreign standard characters and separate character recognition means for identifying foreign standard characters when the latter are detected by said read head.

17. An apparatus according to claim 1 wherein said certain tolerances are at most ±10%.

18. An apparatus according to claim 15 wherein said certain tolerances are at most ±10%.

* * * * *